United States Patent
Marquart

[15] 3,648,969
[45] Mar. 14, 1972

[54] HYDRAULIC CONTROL DEVICE

[72] Inventor: Alfred Marquart, Altluenen, Germany
[73] Assignee: Gewerkschaft Eisenhutte Westfalia, Wethmar bei Lunen, Westfalia, Germany
[22] Filed: Mar. 30, 1970
[21] Appl. No.: 23,660

[30] Foreign Application Priority Data

Apr. 3, 1969 Germany........................P 19 17 237.3

[52] U.S. Cl....................................251/63, 91/415, 91/437
[51] Int. Cl.............................................................F16k 31/363
[58] Field of Search......................137/1; 251/24, 63; 91/415, 91/437

[56] References Cited

UNITED STATES PATENTS 2,896,903  7/1959  Canalizo..................................251/63
3,176,591  4/1965  Howland................................91/437 X

*Primary Examiner*—Henry T. Klinksiek
*Attorney*—Sughrue, Rothwell, Mion, Zinn & Macpeak

[57] ABSTRACT

A hydraulic control device which uses throttle means preferably a one-way valve with a spring loaded ball to produce a differential pressure signal when pressure medium flows through the device. The pressure signal is used to move a piston which in turn actuates control means, such as a slide extension of the piston rod, to control the flow of pressure medium through control channels. The initiation of a working cycle effected by the flow of pressure medium through the control channels can thus be inhibited until the flow of pressure medium through the device has ceased indicating that a preceding working cycle has been completed.

7 Claims, 1 Drawing Figure

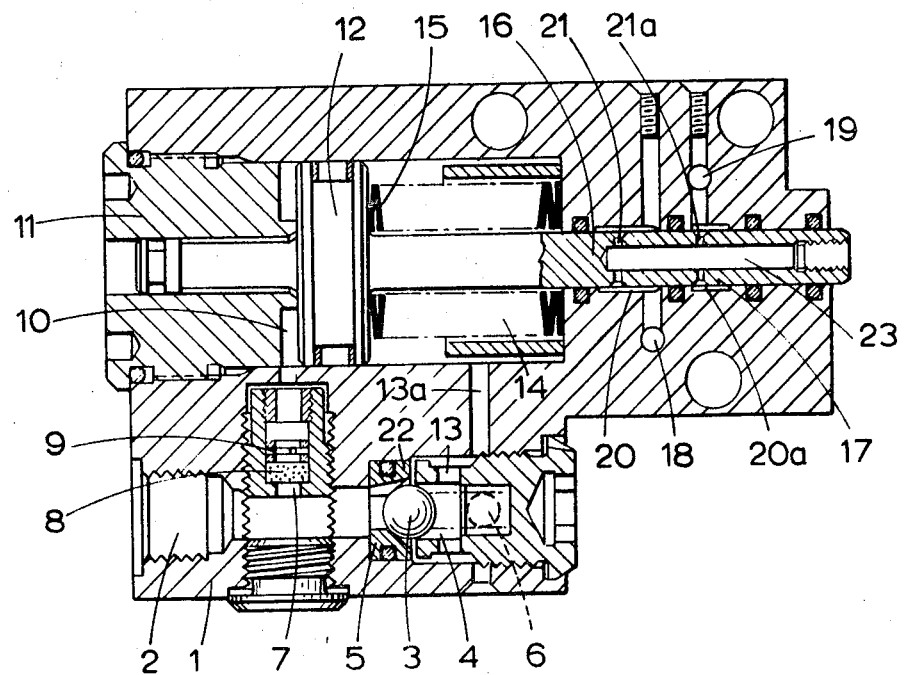

HYDRAULIC CONTROL DEVICE

BACKGROUND TO THE INVENTION

In industry it is frequently necessary for two or more work cycles or movements to be initiated or terminated in succession to one another, each succeeding cycle being required to commence when the preceding cycle has been completed. In these cases the termination of a work cycle does not necessarily coincide with any particular end position, so that a control system cannot use limit switches. Use can be made, however, of a timer which is set in such a way that it does not enable a succeeding work cycle to take place until an assigned maximum period for the execution of the preceding cycle has elapsed. The total period occupied by the individual working cycles in such a setup will therefore always correspond to the sum of the maximum periods by all the individual working cycles. This is obviously wasteful of time.

The object of the invention is to provide a hydraulic control process which enables a succeeding working cycle to be initiated as soon as a preceding working cycle has been completed.

A further object of the invention is to provide an improved hydraulic control device usable in various applications.

SUMMARY OF THE INVENTION

The invention is based on the principle that a movement of a machine for example actuated by pressure medium is not finally terminated as long as pressure medium continue to flow. The flow of the pressure medium can thus be used to produce a pressure difference signal when the pressure medium passes through a suitable throttle means such as a one-way valve. As soon as the pressure medium flow ceases, the differential pressure signal becomes zero. The presence and absence of this differential pressure signal can be utilized for setting up control movements or working cycles.

According to one aspect of the invention there is provided a hydraulic process for controlling the initiation of successive working cycles or movements, said process including the steps of producing a differential pressure from the flow of pressure medium in dependence upon a first working cycle and utilizing the presence or absence of said differential pressure to control a second working cycle.

According to another aspect of the invention there is provided a hydraulic control device, said device comprising an input channel for receiving pressure medium, an output channel, means for producing a differential pressure signal when pressure medium flows from the input channel to the output channel, a piston movable within a cylinder in dependence upon said differential pressure signal, and control means operably associated with said piston and adapted to perform a control function in dependence upon the movement of said piston. The piston is preferably spring-loaded. It is advisable to use as means for producing the pressure signal a one-way valve with a spring-loaded valve element since such a valve produces a throttling action less dependent on the quantity of pressure medium flowing therethrough.

The control means can be a slide attached to the piston and movable to block or open communication between pressure medium control channels and adapted so that communication is established between said control channels when the means for producing a differential pressure produces a zero pressure signal.

This is advantageous since this device still operates when a minimum quantity of pressure medium is still flowing.

In order to ensure that minor temporary static conditions within the control system will not themselves cause this changeover to take place, it is advisable, for certain cases, to modify the response of the device. To this end a throttle may be provided. More particularly a throttle can be provided in one of two feed channels extending between one or other side of the valve and a working chamber of the cylinder containing the piston.

The device can be constructed in a great variety of ways depending upon its application. The simplest version is that in which two working cycles of a process are required to take place in succession without the exact duration of each being definitely fixed. Such an application for the invention arises, for example, in a hydraulically operated boring apparatus with which force is to be imparted to the boring tool when the feed action ceases or falls below a certain minimum value. In this case the control device of the invention can be incorporated in the pressure medium supply of the associated feed motor. As long as the aforesaid feed motion is taking place and pressure medium is accordingly flowing to or from the feed motor, the valve in the device is subject to a differential pressure, by which the control means actuated by the piston, is kept in an operation position in which the force-imparting mechanism is switched off. As soon as the feed action ceases however no pressure medium flows to or from the feed motor, and the differential pressure signal becomes zero. The spring-loaded piston is thus caused to move into its rest position thereby actuating the control means which switches the mechanism on via suitable intermediate control elements. As soon as the boring tool once again begins to move forward, and pressure medium is flowing to or from the feed motor, the device again function to inhibit the mechanism from operating.

The flow of pressure medium which produces the differential signal can be produced indirectly and can be initiated by other forms of sensing means associated with a machine or industrial process.

Another application which can be mentioned by way of a further example is in connection with hydraulically operated travelling roof support frames in mineral mining. With such frames telescopic roof support props which are retracted to allow the frame to be moved must not be braced against the roof again until the movement of the support frame is completed. As a support frame of this kind has to overcome varying degrees of resistance during the shifting operation requires a variable amount of time for completion and cannot be exactly determined in advance. The device of this invention can sense the flow of pressure medium to or from the shifting device of the frame and inhibit the extension of the props until said flow ceases. In such an application the control device preferably has a certain response time during movement of the support frame, since such movement may involve a somewhat jerky steplike motion. The response of the control device can be modified to ensure that the working cycle effected by bracing of the props will not be initiated as soon as the frame comes to a brief halt but only when the response time has been exceeded.

Similar applications arise with a wide variety of hydraulic or nonhydraulic operating apparatus. In these cases it is immaterial whether a servocontrol system is additional or provided whether such a servocontrol system operates hydraulically or pneumatically. Although two working cycles are described for simplicity and where the control means can take a simple form by using stepping mechanisms as a control means actuated by the piston, it is possible to cause a plurality of cycles to take place even although the piston only moves between two operating positions.

BRIEF DESCRIPTION OF DRAWING

A constructional embodiment of the present invention will now be described, by way of example only, with reference to the accompanying drawing which is a sectional side view of a control device made in accordance with the present invention.

DESCRIPTION OF PREFERRED EMBODIMENT

The control device shown in the drawing can be used with hydraulically operated travelling roof support frames for mineral mines. As is known these frames have telescopic props capable of being braced against the roof of a mine and one or more shifting devices for moving the frames.

The device itself is composed of a housing 1 which accommodates a number of removable cartridge units. The device has a main input channel 2 with an inlet which is connectable to a pressure medium conduit connected, for example, to the associated mine support frame shifting cylinder. The channel 2 contains a valve with a valve element in the form of a ball 3 which is biased by a spring 4 against a seating 5. An outlet channel 6 is disposed on the side of the valve 3, 4, 5 remote from the inlet of the channel 2. The channel 6 leads in the example mentioned above, to a source of pressure medium for the shifting device of an associated frame or frames or in other examples possibly to a machine actuated by pressure medium.

A second feed channel 7 communicates with the main input channel 2 between the valve 3, 4, 5 and the inlet of the channel 2. The channel 7 contains a filter element 8 and an interchangeable throttle 9 which can be removed from the housing 1 as a unit. The channel 7 leads into a first working chamber 10 of a cylinder 11 which contains a displaceable piston 12.

A further feed channel composed of portions 13, 13a is provided on the side of the valve 3, 4, 5 remote from the inlet of the channel 2 and communicates with a second working chamber 14 of the cylinder 11, which is disposed on the side of the piston 12 opposite to the chamber 10. The chamber 14 contains a compression spring 15, by means of which the piston 12 is biased towards the left of the drawings. The piston 12 has working surfaces of equal area. A bypass channel 22 forms a connection between the channel 2 and the channel 13a, and thus bypasses the valve 3, 4, 5.

The piston 12 is connected to a piston rod 16 operably associated with control means, in this case an extension in the form of a control slide 17. The control slide 17, in this example, blocks or opens two pressure medium control channels 18, 19, which do not communicate with the channel system 2, 7 but which control some other operation. In the mine frame example mentioned above the channels 18, 19 could be associated with the telescopic support props. In the control slide 17 are provided two transverse borings 21 and 21a, which are connected with a central longitudinal boring 23. In the zone of the incoming control channel 18 and the outgoing control channel 19, the control slide 17 is surrounded by annular grooves 20, 20a. As may be seen from the drawing, it is only when the control slide 17 is in certain positions that there is any communication between the channels 18 and 19.

The operation of the device is as follows:

As soon as pressure medium flows into the channel 2 the ball 3 is moved off its seating 5 and the pressure medium flows into the outlet channel 6. As mentioned before this flow of pressure medium can for example be used to operate the shifting device of the associated mine roof support frame. The action of the valve 3, 4, 5 produces a higher pressure in front, i.e., to the left of the valve than behind, i.e., to the right. Consequently the channel 7 is subjected to a higher pressure than prevails in the channel 13, 13a and as a result of this the pressure in the chamber 10 exceeds the pressure in the chamber 14. The piston 12 is thence displaced to the right of the drawing in opposition to the pressure of the spring 15 and the control slide 17 is likewise displaced to assume a new position. This control slide 17 can act upon the control channels 18, 19 in such a way that a new working cycle or movement is not initiated until a preceding cycle or movement has been terminated. To elaborate on this point, in the mine roof support frame application when the shifting device of the frame is being operated the control slide 17 inhibits communication between the control channels 18, 19 and thereby inadvertent extension of the props operated thereby is prevented. Only when the piston 12 is in the rest position indicating that pressure medium flow through the channels 2, 7 has ceased does the control slide 17 allow the props to be extended by establishing communication between the channels 18, 19.

In its broad general aspect the termination of any working cycle can be indicated by the fact that there is no further flow of pressure medium from the channel 2 to the channel 6. As soon as these conditions occur, the pressure difference between the channels 7 and 13, 13a is nullified and the piston 12 is therefore returned to its initial position, under the action of the spring 15. To ensure that the piston 12 can move to the left the pressure medium in the chamber 10 can flow to the chamber 14 via the channel 7, the bypass channel 22 and the channel 13, 13a.

The response of the device is influenced by the throttle 9 and in cases where a certain retardation or delay of response is required a more intensive throttling effect can be provided by introducing a fresh throttle 9 and conversely where a greater sensitivity is required the throttle 9 can have a less intensive effect.

The control means of the device can take various forms and can be modified. Thus the control means does not necessarily have to take the form shown in the drawing. For example, the piston rod 16 can be caused to actuate a stepping mechanism by which the various stages of an operation to be controlled are initiated successively.

The flow of pressure medium to the channels 2, 6 does not necessarily have to be directly associated with a working cycle. It is also possible for the device to be connected to a control conduit by way of the inlet and outlet channels 2, 6. This control conduit can be connected with a scanning device, for example, which senses the movement of a machine component or the like. As long as the component in question is moving pressure medium is allowed to flow through the device but as soon as the movement is terminated the flow of pressure medium ceases. Appropriate control functions can then be effected by way of the control means associated with the piston rod 16.

I claim:

1. A hydraulic control device, said device comprising
   a. an input channel for receiving pressure medium,
   b. an output channel,
   c. means operably connected to both the input and output channels for producing a differential pressure signal when pressure medium flows from the input channel to the output channel,
   d. a piston movable within a cylinder,
   e. means communicating the differential pressure signal to the cylinder to cause the piston to move in response to said signal, and
   f. control means operably connected with said piston and adapted to perform a hydraulic control function in response to the movement of said piston.

2. A device according to claim 1, wherein the means for producing the differential pressure signal is a one-way valve having a spring-loaded valve element.

3. A device according to claim 2, wherein the communicating means comprises two feed channels, one extending from each operative side of the valve to a working chamber associated with the piston, and wherein there is further provided a throttle in one of said two feed channels.

4. A device according to claim 1, further comprising at least two pressure medium control channels, and wherein the control means is a slide attached to the piston and movable to block or open communication between said control channels.

5. A device according to claim 4, wherein said control channels communicate with each other when the means for producing a differential pressure produces a zero pressure signal.

6. A device according to claim 1, further comprising a throttle operably connected with the communicating means for modifying the response of the device.

7. A device according to claim 1, wherein the piston is spring loaded.

* * * * *